(12) United States Patent
Hall et al.

(10) Patent No.: US 10,183,547 B2
(45) Date of Patent: Jan. 22, 2019

(54) IDLE STOP AND HEATER CONTROL SYSTEM AND METHOD FOR A VEHICLE

(75) Inventors: Chris Hall, Dublin, OH (US); Junichi Kanemaru, Columbus, OH (US)

(73) Assignee: HONDA MOTOR CO., LTD, Tokyo (JP)

( * ) Notice: Subject to any disclaimer, the term of this patent is extended or adjusted under 35 U.S.C. 154(b) by 1851 days.

(21) Appl. No.: 13/480,118

(22) Filed: May 24, 2012

(65) Prior Publication Data
US 2013/0317728 A1 Nov. 28, 2013

(51) Int. Cl.
F02D 28/00 (2006.01)
B60H 1/00 (2006.01)
F02N 11/08 (2006.01)

(52) U.S. Cl.
CPC ..... B60H 1/00778 (2013.01); B60H 1/00828 (2013.01); F02N 11/084 (2013.01); F02N 11/0818 (2013.01); *F02N 2200/023* (2013.01); *F02N 2200/0804* (2013.01); *F02N 2200/0806* (2013.01); *F02N 2200/102* (2013.01); *F02N 2200/122* (2013.01); *Y02T 10/48* (2013.01)

(58) Field of Classification Search
CPC ............ B60H 1/00778; B60H 1/00785; B60H 1/00807; B60H 1/00828; F02N 11/0818; F02N 11/084; F02N 2200/0804; F02N 2200/0806; F02N 2200/0811; F02N 2200/102; F02N 2200/121; F02N 2200/023; Y02T 10/48
USPC ....... 123/179.3, 179.4; 701/112, 113; 62/133
See application file for complete search history.

(56) References Cited

U.S. PATENT DOCUMENTS

| | | | | |
|---|---|---|---|---|
| 4,381,480 A | * | 4/1983 | Hara et al. | 318/471 |
| 5,317,998 A | | 6/1994 | Hanson et al. | |
| 5,706,667 A | * | 1/1998 | Iritani et al. | 62/230 |
| 5,803,166 A | * | 9/1998 | Ito et al. | 165/203 |
| 6,073,456 A | * | 6/2000 | Kawai et al. | 62/133 |
| 6,126,079 A | * | 10/2000 | Shoemaker | 236/35 |
| 6,358,180 B1 | | 3/2002 | Kuroda et al. | |

(Continued)

FOREIGN PATENT DOCUMENTS

| | | | | |
|---|---|---|---|---|
| DE | 102007030540 | | 1/2009 | |
| DE | 102007030540 A1 | * | 1/2009 | ............ B60W 10/06 |

(Continued)

OTHER PUBLICATIONS

International Search Report and Written Opinion of Ser. No. PCT/US2013/038634 dated Aug. 9, 2013.

(Continued)

*Primary Examiner* — John Zaleskas
(74) *Attorney, Agent, or Firm* — Rankin, Hill & Clark LLP

(57) ABSTRACT

An idle stop control system and method for a vehicle includes at least one electronic control unit disposed within the vehicle that is configured to determine whether an idle stop condition for the vehicle is satisfied and whether the vehicle is in a stopped condition. The at least one electronic control unit is further configured to idle stop an engine of the vehicle when determined that both the idle stop condition is satisfied and that the vehicle is in the stopped condition. The at least one electronic control unit is also configured to determine whether an engine restart condition is satisfied after the engine is idle stopped and to restart the engine when determined that the engine restart condition is satisfied.

7 Claims, 7 Drawing Sheets

(56) References Cited

U.S. PATENT DOCUMENTS

| | | | |
|---|---|---|---|
| 6,532,926 B1* | 3/2003 | Kuroda et al. | 123/179.4 |
| 6,701,734 B1* | 3/2004 | Ogawa | 62/244 |
| 6,782,704 B2 | 8/2004 | Kuroda et al. | |
| 6,895,917 B2* | 5/2005 | Itoh et al. | 123/179.4 |
| 7,027,912 B1* | 4/2006 | Metzger | 701/112 |
| 7,247,123 B2 | 7/2007 | Ohtake et al. | |
| 7,556,090 B2* | 7/2009 | Asai et al. | 165/202 |
| 7,562,535 B2* | 7/2009 | Deiml et al. | 62/115 |
| 7,826,961 B2* | 11/2010 | Jinno | 701/112 |
| 2002/0107632 A1 | 8/2002 | Fuse et al. | |
| 2003/0233835 A1* | 12/2003 | Tomita et al. | 62/133 |
| 2004/0020229 A1* | 2/2004 | Adachi et al. | 62/236 |
| 2004/0055305 A1* | 3/2004 | Kuroda et al. | 60/698 |
| 2004/0144107 A1* | 7/2004 | Breton et al. | 62/129 |
| 2004/0149246 A1* | 8/2004 | Itoh et al. | 123/179.4 |
| 2004/0211381 A1* | 10/2004 | Ogawa et al. | 123/179.4 |
| 2005/0056413 A1* | 3/2005 | Homan et al. | 165/203 |
| 2005/0067200 A1 | 3/2005 | Jiang et al. | |
| 2005/0193747 A1* | 9/2005 | Kajimoto et al. | 62/133 |
| 2006/0020385 A1 | 1/2006 | Kakinuma | |
| 2007/0299560 A1* | 12/2007 | LaHue et al. | 700/276 |
| 2008/0006711 A1* | 1/2008 | Ishida et al. | 237/12.3 R |
| 2008/0172170 A1* | 7/2008 | Lecole et al. | 701/113 |
| 2008/0201064 A1 | 8/2008 | Digonis | |
| 2009/0039170 A1* | 2/2009 | Burns et al. | 236/44 A |
| 2009/0078781 A1* | 3/2009 | Kanemaru | 236/49.3 |
| 2009/0143962 A1 | 6/2009 | Tong et al. | |
| 2009/0145141 A1* | 6/2009 | Akahoshi et al. | 62/133 |
| 2009/0150025 A1* | 6/2009 | Akahoshi et al. | 701/36 |
| 2009/0198438 A1* | 8/2009 | Jinno | 701/110 |
| 2009/0314847 A1* | 12/2009 | Nemoto et al. | 237/5 |
| 2010/0011789 A1* | 1/2010 | Carlson et al. | 62/158 |
| 2010/0030431 A1* | 2/2010 | Potter | 701/45 |
| 2010/0100306 A1 | 4/2010 | Gamache et al. | |
| 2012/0152512 A1* | 6/2012 | Mori | 165/202 |

FOREIGN PATENT DOCUMENTS

| | | | | |
|---|---|---|---|---|
| DE | 102009040877 A1 * | 5/2010 | | B60H 1/00 |
| DE | 102010012046 A1 * | 10/2010 | | |
| EP | 0891885 | 1/1999 | | |
| EP | 2098392 A1 * | 9/2009 | | |
| EP | 2169212 | 3/2010 | | |
| JP | 2001180246 A * | 7/2001 | | B60H 1/00 |
| JP | 200484479 | 3/2004 | | |
| JP | 2004-360580 | 12/2004 | | |
| JP | 2004360580 A * | 12/2004 | | F02D 29/02 |
| JP | 2005106057 | 4/2005 | | |
| JP | 2005106057 A * | 4/2005 | | B60K 6/48 |
| JP | 2009138708 | 6/2009 | | |
| JP | 2010030549 A * | 2/2010 | | |
| JP | 2010095052 A * | 4/2010 | | |
| JP | 2010188939 A * | 9/2010 | | |

OTHER PUBLICATIONS

Extended European Search Report of EP Application No. 13 793 341.2 dated Jan. 18, 2016, 8 pages.

* cited by examiner

IDLE STOP AND HEATER CONTROL SYSTEM AND METHOD FOR A VEHICLE

BACKGROUND

Exemplary embodiments herein relate to an idle stop control system and method for a vehicle.

In view of high fuel prices and ever more stringent regulations relating to improved fuel economy and vehicle emissions, vehicle manufacturers are applying idle stop (or start-stop) technology to vehicles equipped with conventional internal combustion engines (e.g., vehicles that are not hybrid-electric or HEVs). However, one concern area for vehicles equipped with idle stop technology is how to maintain comfort within the cabin of the vehicle while the engine is turned off during an idle stop. The current industry accepted method of heating the cabin after the engine is turned off at a stop for non-HEVs is to continue to circulate engine coolant with an auxiliary electric water pump. Another option for maintaining heat within the vehicle cabin is to replace the conventional mechanical water pump with an electric pump so that no auxiliary pump is needed. In either case, residual engine heat can be transported to the heater core, which warms air from the HVAC blower fan to maintain heat within the vehicle cabin.

There are several drawbacks with these options. For example, idle stop technology can be expensive and adding an auxiliary electric water pump or a standalone replacement electric water pump only adds to this cost. Also, once the engine is off during an idle stop, there are concerns related to maintaining the charge of the vehicle's primary battery. Running an electric water pump along with the blower fan only adds to the high electrical load on today's feature rich vehicles during an idle stop. Running the electric water pump while the engine is off may further limit the amount of time before the battery is not able to restart the engine.

Additionally, utilizing an auxiliary pump requires added weight and packaging space, both of which are negatives from a vehicle design standpoint. Finally, the electric water pump typically provides far more performance than is necessary for the average stop time (e.g., in the United States) at a stop sign, traffic signal, random stop in heavy traffic, etc. In the US, stop times can range anywhere from a few seconds to several minutes in traffic or even hours depending on conditions. The electric water pump would only be necessary for extended engine off time periods, which probably cannot be permitted due to concerns with battery charge and engine temperature. In terms of performance, the electric water pump only has a significant advantage in extremely cold conditions. Such conditions are not typically experienced by most vehicle drivers within the United States. In warmer conditions, assuming the vehicle's cabin is allowed to fully saturate to a comfortable temperature first, the sole use of the HVAC blower fan to heat the cabin using only residual heat in the heater core and in the vehicle's cabin air provides more than adequate comfort for short engine stops.

SUMMARY

According to one aspect, an idle stop control method is provided for a vehicle. In the method according to this aspect, a determination is made as to whether an idle stop condition for the vehicle is satisfied. Also, a determination is made as to whether the vehicle is in a stopped condition. The engine of the vehicle is idle stopped when determined that the idle stopped condition is satisfied and that the vehicle is in the stopped condition. After idle stopping the engine, a determination is made as to whether an engine restart condition is satisfied. The engine is restarted when determined that the engine restart condition is satisfied.

According to another aspect, an idle stop control system for a vehicle includes at least one electronic control unit disposed within the vehicle. The at least one electronic control unit is configured to determine whether an idle stop condition for the vehicle is satisfied and whether the vehicle is in a stopped condition. The at least one electronic control unit is further configured to idle stop an engine of the vehicle when determined that both the idle stop condition is satisfied and that the vehicle is in the stopped condition. Also, the at least one electronic control unit is configured to determine whether an engine restart condition is satisfied after the engine is idle stopped and to restart the engine when determined that the engine restart condition is satisfied.

DETAILED DESCRIPTION

Figure 1:
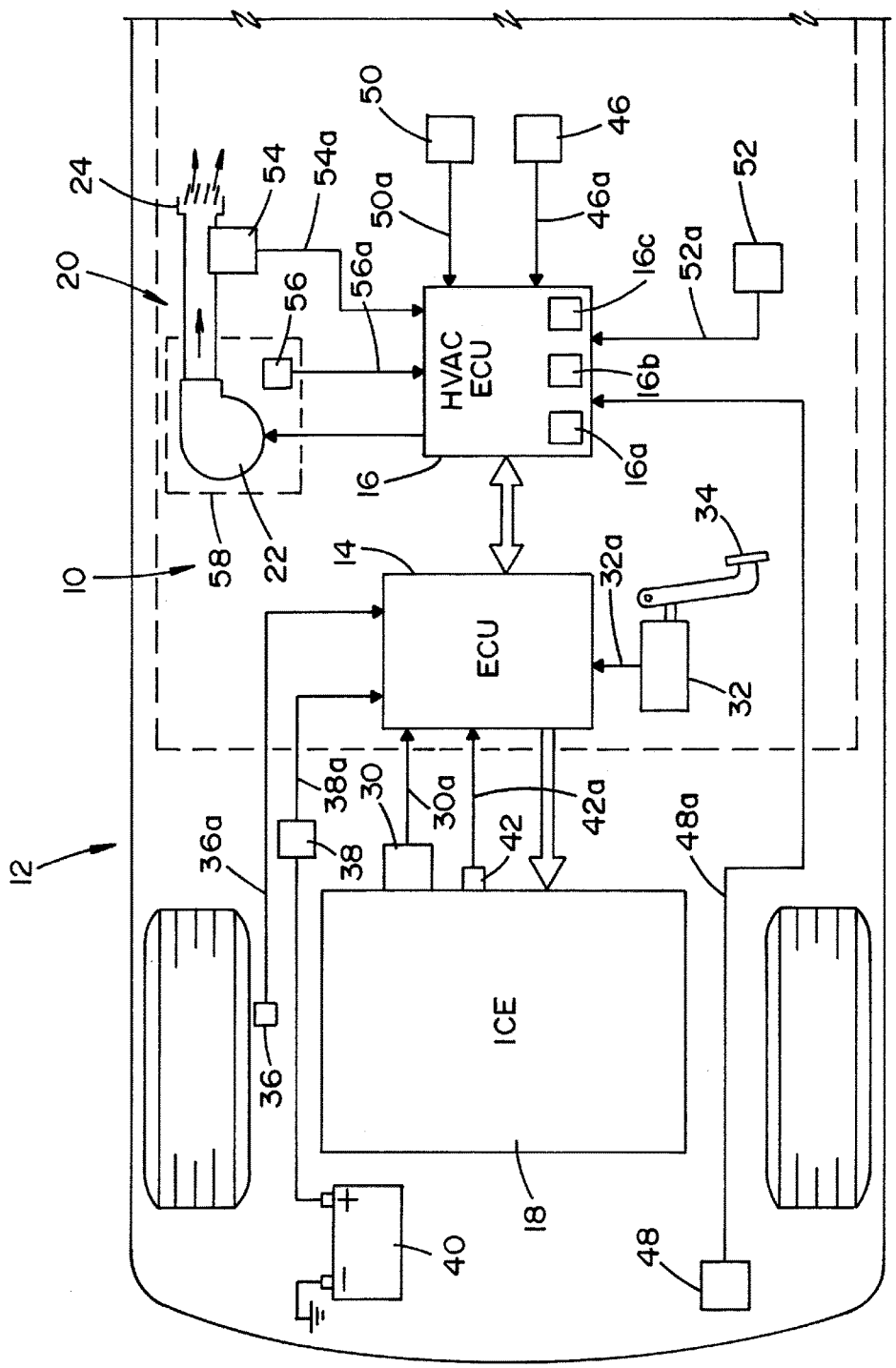
FIG. 1 is a schematic diagram showing an exemplary idle stop control system for a vehicle.

Referring now to the drawings, wherein the showings are for purposes of illustrating one or more exemplary embodiments, FIG. 1 schematically illustrates an idle stop control system 10 for a vehicle 12. The system 10 includes at least one electronic control unit (ECU) disposed within the vehicle 12. In the illustrated embodiment, the at least one electronic control unit includes an engine electronic control unit (ECU) 14 and an HVAC electronic control unit (ECU) 16. The engine ECU 14 is operatively connected to an internal combustion engine 18 of the vehicle 12 and can be the ECU of the vehicle 12 that is configured for controlling operation of the engine 18, such as controlling starting and stopping of the engine 18, fuel injection to the engine 18, throttle valve position for the air intake into the engine 18, etc.

In particular, the engine ECU 14 can send a command signal or signals, which cause fuel injectors (not shown) to cut or cease delivery of fuel to the engine 18. In an exemplary embodiment, the engine ECU 14 directs an injector driver (not shown) to vary output voltage that normally drives the fuel injector and thereby cuts fuel to the engine when appropriate to idle stop the engine 18. The HVAC ECU 16 is operatively connected to an HVAC system 20 of the vehicle 12 and is configured for controlling the HVAC system 20 and thereby operations in the vehicle 12 related to heating, ventilation and air conditioning, as is known by those skilled in the art (e.g., controlling air mix doors, blower speed, air recirculation, etc.).

In any arrangement, whether via a single electronic control unit or multiple electrical control units, the at least one electronic control unit 14, 16 can be configured to determine whether an idle stop condition for the vehicle 12 is satisfied and whether the vehicle 12 is in a stopped condition. The at least one electronic control unit 14, 16 can also be configured to idle stop the engine 18 of the vehicle 12 when determined that both the idle stop condition is satisfied and that the vehicle 12 is in the stopped condition. In addition, the at least one electronic control unit can be configured to determine whether an engine restart condition is satisfied after the engine 18 is idle stopped and to restart the engine 18 when determined that the engine restart condition is satisfied.

When both the engine ECU 14 and the HVAC ECU 16 are employed (e.g., in the illustrated embodiment), the ECUs 14 and 16 can be operatively connected to one another for communicating therebetween. In this regard, the engine ECU 14 and the HVAC ECU 16 can be connected or linked to one another in any known manner, such as through a wired connection (e.g., vehicle CAN bus) or wirelessly. As will be described in more detail below, the engine ECU 14 can be specifically configured to idle stop the engine 18 based on signals from the HVAC control unit 16 and the HVAC ECU 16 can receive signals from the engine ECU 14 that are used to make determinations related to when to initiate engine idle stop and when to end a particular engine idle stop.

As shown, the HVAC system 20 can include an HVAC fan or blower 22 that directs airflow through an evaporator (not shown) and a heater core (not shown) so as to condition the airflow prior to exhausting the same through one or more vents 24 (only one schematically shown in FIG. 1) located in the vehicle 12. The one or more vents 24 can include, for example, a lower or floor heater duct, dashboard vents, defrost vents, side vents, rear ducts, etc. In particular, and as shown the illustrated embodiment, the HVAC blower 22 can be operatively connected to the at least one electronic control unit, such as the HVAC ECU 16 in the illustrated embodiment, for control of the blower 22. In particular, the at least one electronic control unit (HVAC ECU 16 in the illustrated embodiment) can be configured to operate the HVAC blower 22 to maintain comfort within the vehicle 12 where the engine 18 is idle stopped as described in more detail below.

The idle stop control system 10 can additionally include or employ one or more switches and/or sensors for sensing various operating conditions of the vehicle 12. In the illustrated embodiment, the engine ECU 14 is operatively connected to a plurality of sensors for sensing various operating conditions of the engine 18 and other components of the vehicle 12. For example, an engine temperature sensor 30 can be linked to the engine ECU 14 so that the measured engine temperature (TW) can be communicated as a signal 30a indicative of the engine temperature back to the engine ECU 14. In one embodiment, the engine temperature sensor 30 is a coolant temperature sensor that measures a temperature of coolant flowing through the engine 18 to thereby provide indication as to the temperature of the engine 18 back to the engine ECU 14.

A brake switch or sensor 32 can be disposed in association with a brake pedal 34 provided to apply the brakes of the vehicle 12 (or otherwise associated with the braking system in the vehicle 12). The brake switch 32 can be linked via signal 32a to the engine ECU 14 so that the condition of the brake switch 32 can be communicated to the engine ECU 14 (e.g., to indicate whether or not the brakes are being applied on the vehicle 12). Also, a vehicle speed sensor 36, which can measure and provide an indication of vehicle speed, can be linked to the engine ECU 14 so that the measured vehicle speed can be communicated as a signal 36a indicative of vehicle speed to the engine ECU 14. Also, a battery sensor 38, which is operatively connected to a primary battery 40 of vehicle 12, can be linked to the engine ECU 14 for communicating a condition of the battery 40, such as a remaining voltage or charge in the battery 40 via signal 38a. Additionally, an RPM sensor 42 can be linked to the engine ECU 14 for communicating RPMs of the engine 18 to the engine ECU 14 via signal 42a.

The HVAC ECU 16 can also have several switches and/or sensors operatively connected or linked thereto. For example, a cabin temperature sensor 46, which is disposed within a cabin of the vehicle 12 for measuring a temperature thereof, can be linked to the HVAC ECU 16 so that the measured cabin temperature can be communicated as a signal 46a indicative of the temperature within the cabin of the vehicle 12. Similarly, an outside or ambient temperature sensor 48 can be linked to the HVAC ECU 16 for measuring a temperature outside the vehicle 12 and communicating the same via a signal 48a to the HVAC ECU 16. A humidity sensor 50 can also be linked to the HVAC ECU 16. The humidity sensor 50 can measure relative humidity within the cabin of the vehicle 12 and communicate a measurement of the same to the HVAC ECU 16 via a signal 50a.

An engine idle toggle switch 52 can also be provided and operatively connected to the HVAC ECU 16. As described in more detail below, the toggle switch 52 can be used to toggle engine idle stop functionality on and off. The state of the toggle switch 52 can be communicated via signal 52a to the HVAC ECU 16 so that when actuated a first time, engine idle stop functionality is turned off and when pressed further times, engine idle stop functionality is toggled on and then off. Also, a vent temperature sensor 54 can be disposed at the outlet of one of the vents or ducts 24 for sensing a temperature of the airflow passing thereby and communicating the sensed temperature to the HVAC ECU 16 via a signal 54a. Likewise, a HVAC assembly case sensor 56 can be disposed inside an HVAC assembly case 58 for sensing a temperature inside the HVAC assembly case 58 and communicating the sensed temperature to the HVAC ECU 16 via a signal 56a. By way of a non-limiting example, the sensor 56 could be an evaporator sensor for measuring the temperature of airflow entering or exiting an evaporator (not shown) of the HVAC system 20 housed inside the case 58. If desired, the cabin temperature can be determined and/or calculated using the vent temperature sensor 54 and/or the HVAC assembly case sensor 56, and/or could be otherwise calculated as known and understood by those skilled in the art (e.g., using the position of air mix dampers, intake doors, ambient temperature, etc.).

Though not shown, it will be understood and appreciated by those skilled in the art that each of the ECU's 14, 16 can include an input/output interface for sending and receiving signals with the various components of the system 10, including the various sensors and switches described herein. As is known, the input/output interface can include an input circuit having various functions including the function of shaping the wave forms of input signals from the various sensors, switches or other components, a function of correcting the voltage of the input signals to a predetermined level, and a function of converting analog signal values into digital signal values. Also, the input/output interface can include an output circuit for supplying drive signals to the various components of the system 10. Both ECU's 14, 16 can additionally include respective central processing units linked to the input/output interface and linked to a memory circuit including a ROM, which can preliminarily store various operational programs to be executed by the respective CPU of each ECU 14, 16, and a RAM for storing the results of computations or the like by the respective CPUs.

Figure 2:
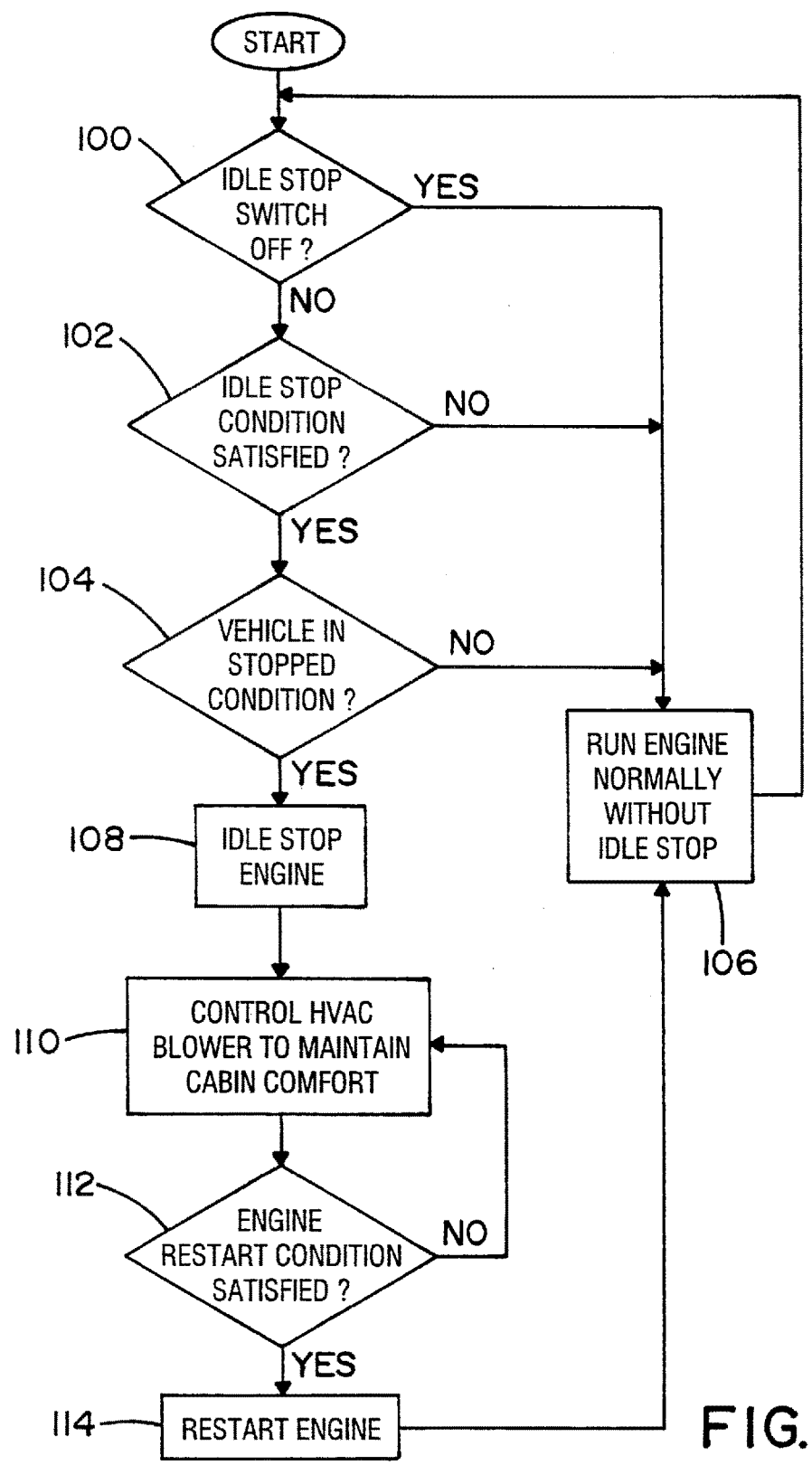
FIG. 2 is a flow chart showing an exemplary idle stop control method for a vehicle.

With reference to FIG. 2, an idle stop control method is shown according to one exemplary embodiment for idle stopping an internal combustion engine. The method of FIG. 2 can be used with the idle stop control system 10 of FIG. 1 and will be described with particular reference thereto, though this is not required and it is to be appreciated that the idle stop control method could be applied to other control systems. In the method of FIG. 2, a determination is made at 100 as to whether the idle stop toggle switch 52 is in its off position or state. At 102, a determination is made as to whether an idle stop condition for the vehicle 12 is satisfied and, at 104, a determination is made as to whether the vehicle 12 is in a stopped condition.

As indicated at 106, the engine 18 is run normally without idle stop being applied when one or more of: the idle stop toggle switch 52 is determined to be in the off position in 100, the idle stop condition is not determined to be satisfied in 102 and/or the vehicle 12 is not determined to be in a stopped condition in 104. On the other hand, the method proceeds to 108 and the engine 18 is idle stopped when determined that the idle stop switch 52 is not in the off position in 100, the idle stop condition is determined to be satisfied in 102, and the vehicle is determined to be in the stopped condition in 104. Optionally, no toggle switch 52 need be provided in association with the system 10 and step 100 can be eliminated. In such an optional arrangement, idle stopping of the engine 18 of vehicle 12 can occur when the idle stop condition is determined to be satisfied in 102 and the vehicle 12 is determined to be in the stop condition in 104 (i.e. no determination need be made with respect to an idle stop toggle switch).

As shown in 110, idle stopping the engine 18 can include operating the HVAC blower 22 to maintain a comfort level within the vehicle cabin of the vehicle 12, as will be described in more detail below. Also after idle stopping the engine in 108, a determination is made in 112 as to whether an engine restart condition is satisfied. The engine 18 is restarted when determined in 112 that the engine restart condition is satisfied and the method can proceed to 106 wherein the engine 18 is run normally without idle stop until the determinations in 100, 102 and 104 again indicate that the engine 18 should be idle stopped in 108.

Determining if the idle stop condition is satisfied in 102 can include determining whether a selected cabin temperature within the vehicle 12 has saturated the vehicle cabin. More specifically, when a user sets a desired temperature for the vehicle cabin (or sets desired temperatures for multiple zones within the vehicle cabin), determining if the idle stop condition is satisfied can include making a determination as to whether these set temperatures have been saturated throughout the vehicle cabin (or zones within the vehicle cabin). In one embodiment, the idle stop condition can be determined as having been satisfied in 102 when a coolant temperature of engine coolant of the engine 18 in the vehicle 12 as measured by the sensor 30 is above a predetermined coolant temperature.

In particular, the predetermined coolant temperature can be set at a level (e.g., 80° C.) at which it can be presumed that temperature saturation is likely to have occurred within the vehicle cabin. Accordingly, the idle stop condition can be determined in 102 as having been satisfied when the coolant temperature is above the predetermined coolant temperature, which is set to represent a point where it is likely that saturation of a preselected cabin temperature within the vehicle has occurred. As described above, the coolant temperature as measured by sensor 30 can be communicated via signal 30a to the engine ECU 14 and the engine ECU 14 can communicate with the HVAC ECU 16 so that both ECU's 14, 16 can be apprised of the idle stop condition having been satisfied.

In another embodiment, the idle stop condition can be determined as satisfied in 102 when the engine 18 has been running continuously for more than a predetermined period of time. A predetermined period of time (e.g., 10 minutes) can be a period of time selected that approximates when temperature saturation is likely to have occurred within the vehicle 12. Either or both of the ECU's 14, 16 can include a timer that measures the elapsed time for which the engine 18 has been running for determining whether the engine has been running continuously for more than the predetermined period of time.

Optionally, the predetermined period of time can be based on ambient temperature. More particularly, when based on ambient temperature, the predetermined period of time can be variable and set based on ambient temperature as measured by sensor 48 and communicated to the HVAC ECU 16. In this regard, and for example, the HVAC ECU 16 can include a look-up table in its memory that provides the predetermined period of time based on the ambient temperature as measured by the sensor 48 and communicated via signal 48a to the HVAC ECU 16. For example, when the ambient temperature as measured by the sensor 48 is relatively low (e.g., 0° C.), the predetermined period of time can be set relatively high (e.g., 15 minutes) as compared to a situation where the ambient temperature is relatively high (e.g., 20° C.) for which the predetermined period of time can be relatively lower (e.g., 5 minutes).

In yet another embodiment, the idle stop condition can be determined as satisfied in 102 based on each of the following in combination: an elapsed time the engine has been running continuously, an average RPM for the engine 18 and ambient temperature. In this regard, an RPM sensor 42 can measure RPM of the engine 18 when the engine 18 is running and communicate such RPM via signal 42a to the engine ECU 14. As already mentioned, the ambient temperature can be measured by the sensor 48 and communicated via signal 48a to the HVAC ECU 16. The RPMs for the engine 18 communicated to the engine ECU 14 via sensor 42 can be further communicated to the HVAC ECU 16 and the HVAC ECU 16 can calculate via a calculating module 16a the average RPM for the engine 18 based on the elapsed time the engine has been running, such elapsed time can be measured by a timer 16b of the HVAC ECU 16. A look-up table 16c can then be used to determine whether the idle stop condition is satisfied. The calculation module 16a, timer 16b and look-up table 16c can all be based within the HVAC ECU 16 as will be understood and appreciated by those skilled in the art.

The HVAC ECU 16 can also compare the calculated RPM average against the measured ambient temperature to determine if it is acceptable to idle stop the engine. Also, the elapsed time can be used in conjunction with the RPM average and the temperature sensor and only when the elapsed time for the engine 18 in a continuously running state exceeds a predetermined threshold is when the idle stop condition is satisfied in 102. Thus, by way of example only, when the RPM average is less than 1,000 RPM, a series of prescribed elapsed time and thresholds can be established for different ambient temperatures. If the elapsed time for which the engine 18 has been running exceeds the time threshold for a particular ambient temperature, then the idle stop condition is satisfied; otherwise, the idle stop condition is not satisfied. When the RPM average is higher, the threshold elapsed times can be reduced as it can be assumed that more saturation of temperature within the vehicle cabin has occurred more rapidly at higher ambient temperature conditions.

In still another embodiment, determining if the idle stop condition is satisfied in 102 can be based on the cabin temperature within the vehicle 12 as measured by the sensor 46 and communicated via signal 46*a* to the HVAC ECU 16. In one specific example, the idle stop condition can be determined as satisfied in 102 based on a change in the cabin temperature over a predetermined period of time being less than a predetermined change amount. For example, if the change in cabin temperature over one minute, one minute being the predetermined period of time, is less than 1° C., an exemplary predetermined change amount, it can be determined that saturation of the preset temperature within the vehicle cabin has occurred and thus the idle stop condition can be determined as satisfied in 102.

The foregoing are only a few examples of how to determine if the idle stop condition is satisfied in 102, and are particular examples of when the determination can correspond to a likelihood of saturation having occurred within the vehicle cabin of the vehicle 12. It is to be appreciated by those skilled in art that other methods can be used for determining if the idle stop condition is satisfied. It is also to be appreciated that one or more of the foregoing examples or other such methods can be combined. For example, the coolant temperature of the engine 18 exceeding the predetermined coolant temperature threshold can be used in combination with determining whether an elapsed time that the engine has been running continuously exceeds a predetermined threshold that is based on average RPM for the engine 18 and ambient temperature.

Figure 3:
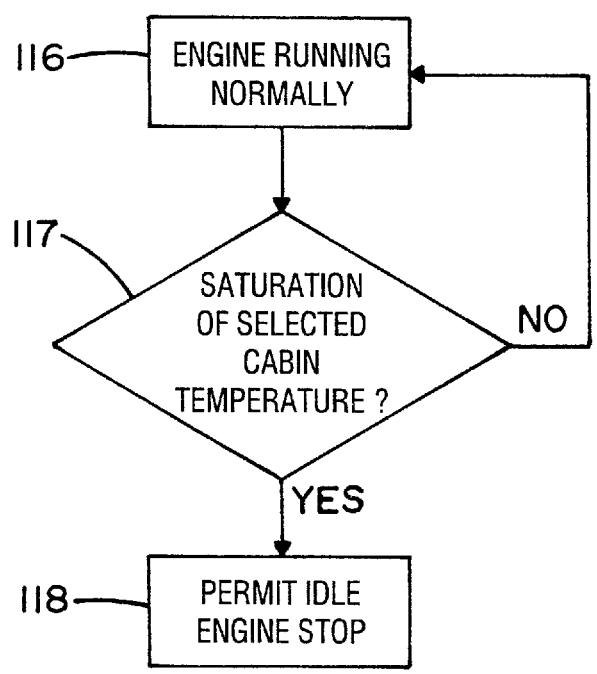
FIG. 3 is a flow chart showing an exemplary control method for determining when an idle engine stop is permitted.

With reference to FIG. 3, a method for determining whether saturation of a selected cabin temperature has occurred is illustrated. In 116, the engine is running normally. In 117, whether saturation of a selected cabin temperature has occurred is determined. This determination can be one or more of the examples discussed above in association with the determination in 102 of whether the idle stop condition is a satisfied condition. If determined in 117 that saturation of a selected cabin temperature has occurred, the method proceeds to 118 wherein idle engine stop is permitted; otherwise, the method reverts to 110 wherein the engine continues to run normally.

Returning reference to FIG. 2, examples will now be described for when the vehicle can be determined to be in a stopped condition in 104. In one example, when the vehicle brake switch 32 indicates that the brake pedal 34 is being actuated, the brake switch can send a signal 32*a* to the engine ECU 14, which can communicate with the HVAC ECU 16 and a determination can be made that the vehicle is in a stopped condition. In addition, or in the alternative, the speed sensor 36 can measure the speed of the vehicle 12 and send a signal 36*a* indicative of such measured speed to the engine ECU, which can communicate this with the HVAC ECU 16. If the speed is zero, it can be determined that the vehicle is in the stopped condition in 104.

As mentioned, when the engine 18 is idle stopped in 108, the HVAC blower 22 can be controlled to maintain cabin comfort in 110. In particular, a control method can be employed for controlling the HVAC blower 22 to maintain cabin comfort within the vehicle 12. In one embodiment, operating the HVAC blower 22 to maintain a comfort level in the vehicle 12 can include supplying a low voltage to the HVAC blower 22. In one example, the low voltage can be supplied to the HVAC blower 22 until a sensed temperature within the vehicle, as measured by the sensor 46 and communicated to the HVAC ECU 16 via signal 46*a*, falls below a predetermined threshold (e.g., 25° C.). In another example, the sensed temperature can be a temperature measured by the sensor 54 disposed at an outlet location of one of the vents or ducts 24. For improved performance, the HVAC ECU 16 can be set to recirculate airflow from the vehicle cabin, which will reduce the rate at which the cabin cools down.

Figure 4:
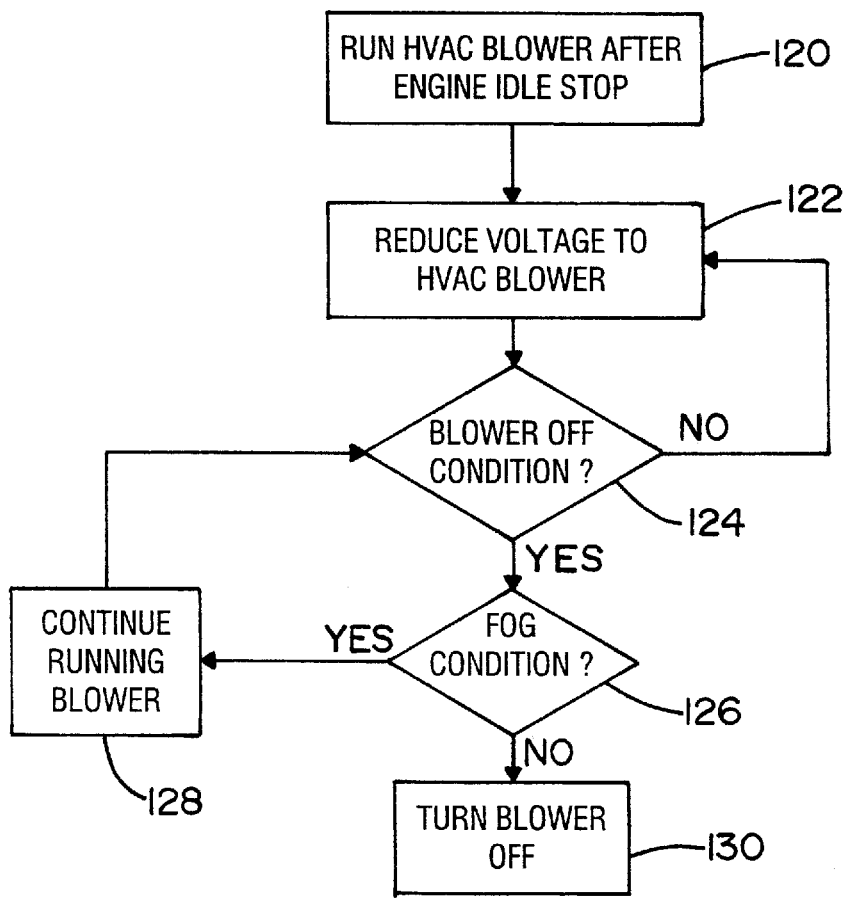
FIG. 4 is a flow chart showing an exemplary HVAC blower control method for an HVAC blower during an engine idle stop.

With reference to FIG. 4, one exemplary blower control method is illustrated. The method of FIG. 4 can be used for controlling the HVAC blower 22 to maintain cabin comfort, such as at 110 in FIG. 2. As illustrated in FIG. 4, the HVAC blower 22 can be run and controlled by the HVAC ECU 16 after engine idle stop in 120. Over time, the voltage to the HVAC blower 22 can be reduced in 122. Thus, supplying low voltage to the HVAC blower 22 can include incrementally decreasing the voltage supplied to the HVAC blower 22. In 124, a determination can be made as to whether the blower should be in the off condition. This can include determining whether a sensed temperature falls below a predetermined threshold.

For example, the sensed temperature can be a cabin temperature as measured by sensor 46, a duct outlet temperature as measured by sensor 54 and/or some other measured temperature. When one or more sensed temperatures falls below corresponding thresholds, it can be determined that the blower should be in the off condition at 124 and the method can proceed to 126. Alternatively, if the temperature remains above the predetermined threshold, the method can revert to 122, and voltage to the HVAC blower 22 can be further reduced incrementally. Optionally, supplying the low voltage to the HVAC blower 22 can include decreasing the voltage supplied to the HVAC blower 22 based on a sensed temperature, such as the cabin temperature sensed by sensor 46 and/or the outlet temperature sensed by sensor 54 at the duct outlet 24. Accordingly, the voltage to the blower 22 can correspond directly and be reduced in corresponding relation as the temperature measured by one or both sensors 46, 54 decreases during the engine idle stop of the engine 18.

When the blower off condition is determined to be satisfied in 124, a determination can be made as to whether a fog condition exists in the vehicle 12 at 126. In particular, a determination can be made as to whether the glass temperature is close to the dew point by calculation or table. In this regard, humidity sensor 50 which measures relative humidity in the vehicle can communicate via signal 50*a* to the HVAC ECU 16. This measurement in combination with the sensed temperature inside the vehicle as sensed by sensor 46, and in combination with the sensed ambient temperature as sensed by sensor 48, can be used to determine whether a fogging condition is likely in the vehicle as is known and understood by those skilled in the art. Accordingly, operating the HVAC blower 22 can include supplying a voltage to the HVAC blower 22 unless glass temperature becomes close to dew point by calculation using ambient temperature, cabin temperature and cabin humidity as determined at 126. If determined that a fog condition exists at 126, the method proceeds to 128 and the HVAC ECU 16 continues running the blower 22; otherwise, the method proceeds to 130 wherein the blower 22 is turned off. After 128 or 130, when the method of FIG. 4 is employed at 110 in FIG. 2, the method of FIG. 2 can proceed with determining whether the engine restart condition is satisfied at 112.

In addition or in the alternative, control of the blower at 160 can begin with maintaining the HVAC system 20 in a full recirculate (or in a mostly recirculate) state wherein air from within the vehicle cabin is recirculated through the HVAC system 20. Humidity can be monitored as described above and when determined that a fogging condition is likely (e.g., as described in association with 126), the HVAC system 20 can switch to a fresh air state when air for the HVAC system 20 is taken from outside the vehicle 12 and/or the engine 18 can be restarted. Whether the switch is made to the fresh air state and/or the engine is started can be based on the cabin temperature as measured by temperature sensor 46, the vent temperature as measured by the sensor 54 and/or the engine temperature as measured by sensor 30, humidity sensor reading, and ambient temperature sensor reading.

Figure 7:
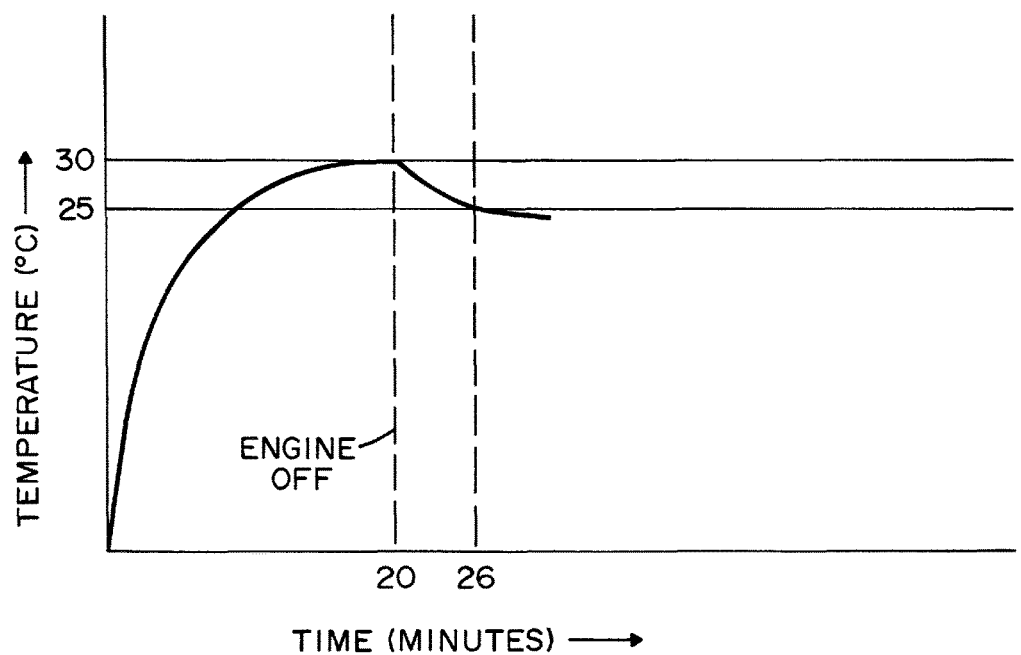
FIG. 7 is a chart showing cabin temperature within a vehicle after an engine idle stop employing an exemplary HVAC blower control method.

With brief reference to FIG. 7, a time versus temperature curve is shown that illustrates exemplary cabin temperatures within a vehicle over a period of time assuming 0° C. ambient temperature conditions. As shown, the engine and the vehicle cabin in the illustrated example are initially in a cold condition (e.g., 0° C.). In the illustrated example, after an elapsed amount of time (e.g., 20 minutes), the cabin has warmed up to a first cabin temperature (e.g., 30° C.) and the engine is shut down or turned off, such as would occur when an idle stop is applied. In a vehicle employing the system of FIG. 1 and/or the blower control methods described herein (e.g., the blower control method of FIG. 4), the temperature drop off after the engine is idle stopped can be relatively moderate (as shown in the example of FIG. 7). This ensures cabin comfort is maintained during engine idle stop conditions without the need for an auxiliary water pump or an electric water pump. For example, the cabin temperature can remain above a lower limit comfort threshold for a defined period of time (e.g., several minutes). In the example illustrated in FIG. 7, the lower limit comfort threshold can be 25° C. and the defined period of time can be 6 minutes.

Returning reference to FIG. 2, while the engine is idle stopped at 108 and the HVAC blower 22 controlled at 110 (e.g., via the method of FIG. 4), the determination of whether the engine restart condition is satisfied at 112 can be made. By way of example, this determination can include sensing a cabin temperature inside the vehicle cabin of the vehicle 12, such as by sensor 46, and communicating the sensed temperature via signal 46a to the HVAC ECU 16. The HVAC ECU 16 can then determine whether the sensed cabin temperature is less than a predetermined cabin temperature. If yes, the engine restart condition can be determined as satisfied in 112 and the engine 18 can be restarted in 114. Alternatively, or in addition, the temperature sensed via sensor 54 for one of the ducts 24 could be used.

In addition, or in the alternative, the determination in 112 can include monitoring the brake switch 32 and communicating the status thereof via signal 32a to the engine ECU 14, which can communicate the brake switch status to the HVAC ECU 16. The HVAC ECU 16 can determine whether the brake switch 32 indicates the vehicle brakes of the vehicle 12 are no longer being applied (i.e., a stopping condition no longer applies). If yes, it can be determined that the engine restart condition is satisfied in 112 and the engine can be restarted in 114. As a further addition or alternative, determining whether the engine restart condition is satisfied in 112 can include sensing the voltage of the primary battery 40 of the vehicle such as via sensor 38 and signal 38a communicated to the engine ECU 14. One or both the ECU's 14, 16 can determine whether the sensed voltage is below a predetermined battery voltage. If yes, the engine restart condition can be determined as satisfied at 112 and the engine can be restarted at 114.

Still another addition or alternative, the engine restart condition can be determined as satisfied in 112 when a predetermined amount of time has elapsed since the engine was idle stopped (e.g., elapsed time exceeds a predetermined threshold, such as 10 minutes). The predetermined amount of time or threshold amount of time can be a single predetermined amount of time or can be a plurality of thresholds that are each based on ambient temperature as measured by the sensor 48. For example, the sensor 48 measures the ambient temperature at 0° C., then the predetermined amount of time can be relatively low (e.g., 5 minutes) as compared to when the sensor 48 measures the ambient temperature at 20° C.

Figure 5:
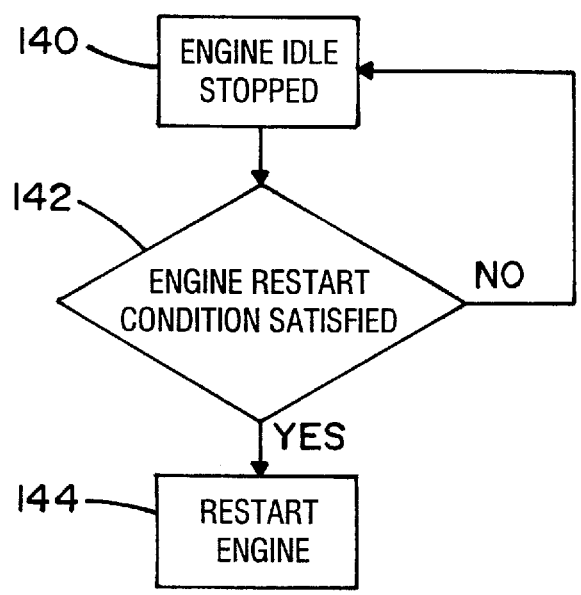
FIG. 5 is a flow chart showing an exemplary control method for determining when to restart an engine after idle stop.

With reference to FIG. 5, a method for restarting the engine after an idle stop condition is illustrated. In the method, the engine is idle stopped at 140, which can be the same as described in association with idle stopping the engine at 108 in FIG. 2. Next, at 142, a determination can be made as to whether the engine restart condition is satisfied. This determination can be as described hereinabove in reference to 112 in FIG. 2. More particularly, one or more of the examples provided in association with 112 can be used in the method of FIG. 5 to determine if the engine restart condition is satisfied. If yes, the engine can be restarted in 144; otherwise, the method reverts to 140 where the engine remains idle stopped and off.

Figure 6:
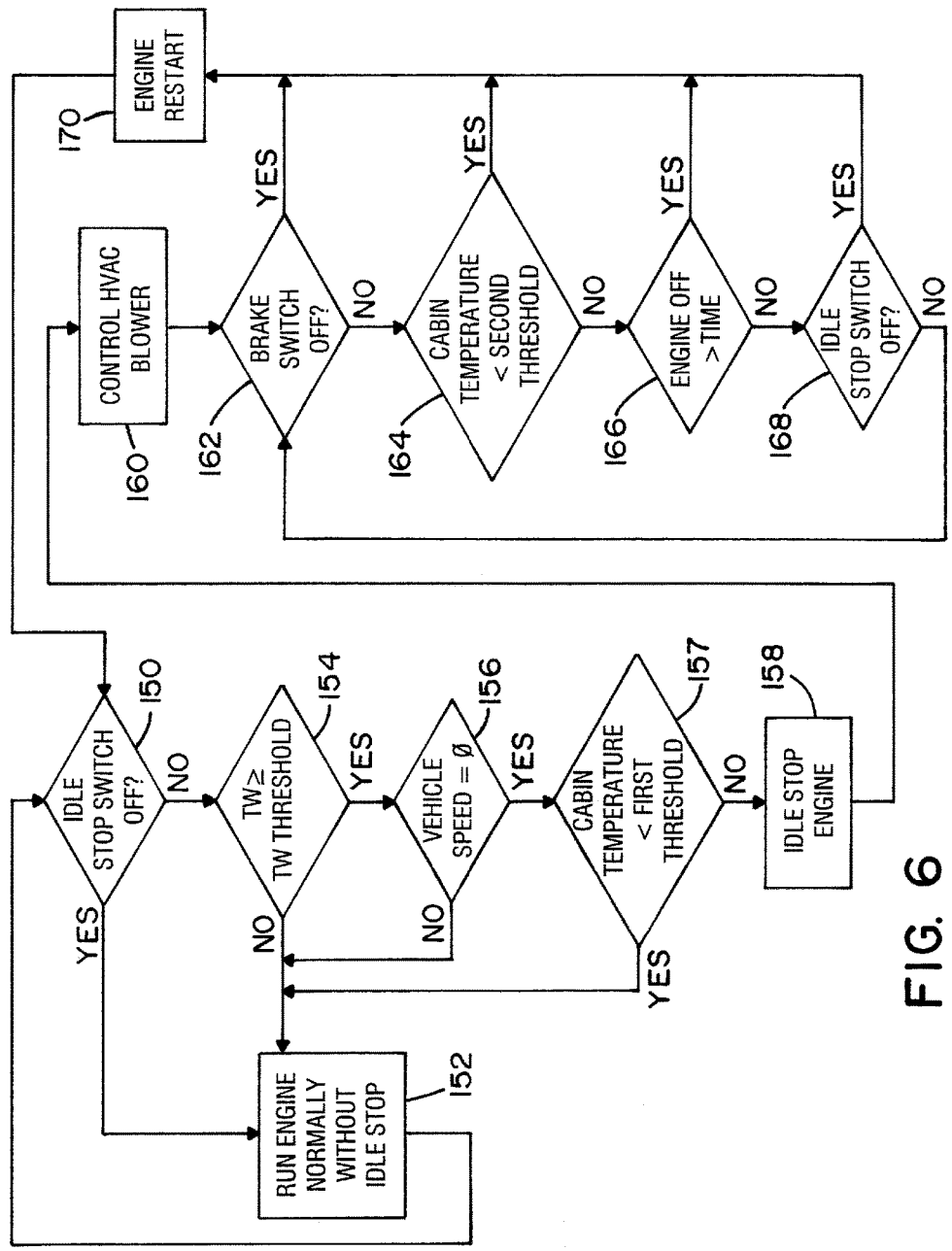
FIG. 6 is a flow chart showing another exemplary idle stop control method for a vehicle.

FIG. 6 is an exemplary embodiment of a specific idle stop control method that can be used in association with the system 10 of FIG. 1, though this is not required. At 150, a determination is made as to whether the idle stop toggle switch 52 is off. If yes, the method proceeds to 152 wherein the engine 18 is run normally without applying idle stop. If no, the method proceeds to 154 wherein a determination is made as to whether the engine coolant temperature as measured by sensor 30 exceeds a predetermined threshold, such as 80° C. If yes, the method proceeds to 156. If no, the method proceeds to 152. At 156, a determination is made as to whether the vehicle speed as measured by sensor 36 equals zero. If yes, the method proceeds to 157. If no, the method proceeds to 152 and the engine 18 is run normally without idle stop.

Next at 157, a determination is made as to whether the sensed cabin temperature as measured by the sensor 46 is below a first predetermined threshold, such as 30° C. Alternatively, the temperature as measured by the vent sensor 54 or the HVAC sensor 56 could be used or cabin temperature could be estimated as described above. If yes at 157, the method proceeds to 158; if no, the method proceeds to 152 wherein the engine is run normally without idle stopping. Accordingly, the determination at 157 is used to decide if the engine should be idle stopped.

At 158, the engine 18 is idle stopped. When idle stopped, the HVAC blower 22 is controlled at 160 to maintain comfort within the vehicle cabin of the vehicle 12. This can occur as described above and/or as described in association with FIG. 4. While the engine is idle stopped at 158 and the HVAC blower 22 is controlled at 160, further determinations can be made for purposes of determining whether the engine 18 should be restarted. For example, at 162, a determination is made as whether the brake switch 32 is off. At 164, a determination is made as to whether the sensed cabin temperature as measured by sensor 46 is below a predetermined threshold, such as 25° C. Alternatively, the temperature as measured by the vent sensor 54 could be used or cabin temperature could be estimated as described above. At 166, a determination is made as to whether the engine has been off for more than a predetermined amount of time, such as five minutes. At 168, a determination is made as to whether the idle stop toggle switch 52 is off. If yes in any of 162, 164, 166 or 168, the engine is restarted at 170; otherwise, the method loops back through 162, 164, 166 and 168 until one of these conditions is satisfied.

Advantageously, the system and methods described herein can be used to provide cabin comfort within the vehicle 12 without the need for a supplemental electric water pump or a replacement electric water pump. Use of the residual heat within the vehicle's heater core and recirculated cabin air and with smart control of the voltage to the HVAC blower 22 can provide extended cabin comfort time depending on ambient conditions. This cabin comfort time is dependent on whether the cabin temperature within the vehicle 12 is fully saturated to a preset or comfortable temperature before the engine turns off. Also advantageously, the system and methods described herein rely on communication between the engine ECU 14 and the HVAC ECU, when both are employed, to optimize fuel efficiency and cabin comfort.

It is to be appreciated that in connection with the particular exemplary embodiments presented herein certain structural and/or functional features are described as being incorporated in defined elements and/or components. However, it is contemplated that these features may, to the same or similar benefit, also likewise be incorporated in common elements and/or components, or separated, where appropriate. For example, one or both the ECUs 14, 16 could be distributed throughout the system 10 or could be combined into a single ECU. It is also to be appreciated that different aspects of the exemplary embodiments may be selectively employed as appropriate to achieve other alternative embodiments suited for desired applications, the other alternate embodiments thereby realizing the respective advantages of the aspects incorporated herein.

It is also to be appreciated that particular elements or components described herein may have their functionality suitably implemented via hardware, software, firmware, or in combination thereof. Additionally, it is to be appreciated that certain elements described herein as incorporated together may under suitable circumstances be stand-alone elements or otherwise divided. Similarly, a plurality of particular functions described as being carried out by one particularly element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An idle stop control system for a vehicle, comprising:
at least one electronic control unit disposed within the vehicle, the at least one electronic control unit configured to determine whether an idle stop condition for the vehicle is satisfied and whether the vehicle is in a stopped condition, the at least one electronic control unit further configured to idle stop an engine of the vehicle when determined that both the idle stop condition is satisfied and that the vehicle is in the stopped condition, and also configured to determine whether an engine restart condition is satisfied after the engine is idle stopped and to restart the engine when determined that the engine restart condition is satisfied, and further including an HVAC fan operatively connected to the at least one electronic control unit, the at least one electronic control unit operating the HVAC fan during the idle stop by supplying a low voltage to the HVAC fan, wherein the low voltage supplied to the HVAC fan is controlled by the at least one electronic control unit to correspond directly and be reduced in corresponding relation as a sensed temperature of a vehicle cabin decreases during the idle stop of the engine,
wherein the idle stop condition is satisfied when a coolant temperature of engine coolant of the vehicle is above a predetermined coolant temperature; and
a sensor configured to sense the sensed temperature of the vehicle cabin.

2. The idle stop control system of claim 1 wherein the at least one electronic control unit is configured to operate only the HVAC fan to continue heating the cabin and maintain comfort within the vehicle while the engine is idle stopped.

3. The idle stop control system of claim 1 wherein the at least one electronic control unit includes:
an engine electronic control unit operatively connected to the engine and configured to control the engine; and
an HVAC control unit operatively connected to an HVAC system of the vehicle and configured to control the HVAC system, the engine electronic control unit and the HVAC control unit operatively connected to one another for communicating therebetween, the engine electronic control unit configured to idle stop the engine based on signals from the HVAC control unit.

4. The idle stop control system of claim 1 wherein the at least one electronic control unit operates the HVAC fan during the idle stop by supplying the low voltage to the HVAC fan until the sensed temperature falls below a predetermined threshold.

5. The idle stop control system of claim 1 wherein the at least one electronic control unit supplies the low voltage in incrementally decreasing amounts to the HVAC fan based on the sensed temperature of the vehicle cabin.

6. The idle stop control system of claim 1 wherein the at least one electronic control unit decreases the voltage supplied to the HVAC fan based on the sensed temperature at an outlet of an HVAC duct within the vehicle.

7. The idle stop control system of claim 1 wherein the at least one electronic control unit operates the HVAC fan during the idle stop by supplying the low voltage to the HVAC fan unless both the sensed temperature falls below a predetermined threshold and a calculated or sensed humidity within the vehicle remains below a predetermined humidity threshold.

* * * * *